US011683167B2

(12) United States Patent
Kornev et al.

(10) Patent No.: US 11,683,167 B2
(45) Date of Patent: Jun. 20, 2023

(54) NETWORK TRAFFIC MANAGEMENT USING SERVER NAME INDICATION

(71) Applicant: Cujo LLC, Walnut, CA (US)

(72) Inventors: Evgeny Kornev, Helsinki (FI); Matti Niemenmaa, Helsinki (FI)

(73) Assignee: Cujo LLC, Walnut, CA (US)

( * ) Notice: Subject to any disclaimer, the term of this patent is extended or adjusted under 35 U.S.C. 154(b) by 115 days.

(21) Appl. No.: 17/373,918

(22) Filed: Jul. 13, 2021

(65) Prior Publication Data

US 2023/0012504 A1 Jan. 19, 2023

(51) Int. Cl.
*H04L 29/06* (2006.01)
*H04L 9/08* (2006.01)
*H04L 9/06* (2006.01)
*H04L 9/32* (2006.01)

(52) U.S. Cl.
CPC .......... *H04L 9/0869* (2013.01); *H04L 9/0631* (2013.01); *H04L 9/0637* (2013.01); *H04L 9/3242* (2013.01); *H04L 2209/04* (2013.01)

(58) Field of Classification Search
None
See application file for complete search history.

(56) References Cited

U.S. PATENT DOCUMENTS 9,419,942 B1 8/2016 Buruganahalli et al.
2018/0205618 A1* 7/2018 Weiner ................ H04L 41/5012
2019/0075093 A1* 3/2019 Anderson ........... H04L 63/0876
2020/0076909 A1* 3/2020 Kuperman .............. H04W 4/00
2020/0076910 A1* 3/2020 Kuperman .............. H04W 4/00

OTHER PUBLICATIONS

Extended European Search Report for European Patent Application No. 22182735.5, dated Dec. 2, 2022, 9 pages.
Kuehlewind, M., et al., "Manageability of the QUIC Transport Protocol (draft-ietf-quic-manageability-12)," Internet Engineering Task Force, Network Working Group, Jun. 30, 2021, 32 pages.
Thomson, M. et al., "Using TLS to Secure QUIC," Internet Engineering Task Force, Request for Comments 9001, Standards Track, May 2021, 31 pages.

* cited by examiner

*Primary Examiner* — Andrew J Steinle
(74) *Attorney, Agent, or Firm* — Dority & Manning, P.A.

(57) ABSTRACT

A network gateway apparatus monitors Quic user datagram protocol (UDP) Internet Connection (QUIC) packets between a first device and a second device, extracts a version of the QUIC protocol and a connection identification from an unprotected portion of the protected header in response to detecting a QUIC packet having a protected header in use, determines a salt used in encryption of the protected header based on the version of the QUIC protocol, calculates a client initial secret based on the salt and the connection identification, determines an unprotected payload of the QUIC packet based on the client initial secret, a protected payload of the QUIC packet and the unprotected portion of the protected header, and extracts a server name indication (SNI) from the unprotected payload.

20 Claims, 3 Drawing Sheets

NETWORK TRAFFIC MANAGEMENT USING SERVER NAME INDICATION

TECHNICAL FIELD

The present application relates generally to network security, and specifically to methods and apparatuses for managing network traffic connections using server name identification.

BACKGROUND

In various network security solutions, connections between network devices must often be authorized by an external service, such as a security service provider or the like. The external service may be used to determine whether the user is allowed to access requested contents or whether the connections should be blocked, for example. Proportion of encrypted web traffic is increasing which raises challenges related to security monitoring of the encrypted traffic.

It can be desirable to manage network connections without risking security at the same time.

SUMMARY

According to an aspect of the invention there is provided a method as specified in claim 1.

According to another aspect of the invention, there is provided an apparatus in a computer network system as specified in claim 11.

According to another aspect of the invention, there is provided a non-transitory computer-readable medium comprising stored program code, the program code comprised of computer-executable instructions that, when executed by a processor device, causes the processor device to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Figure 1:
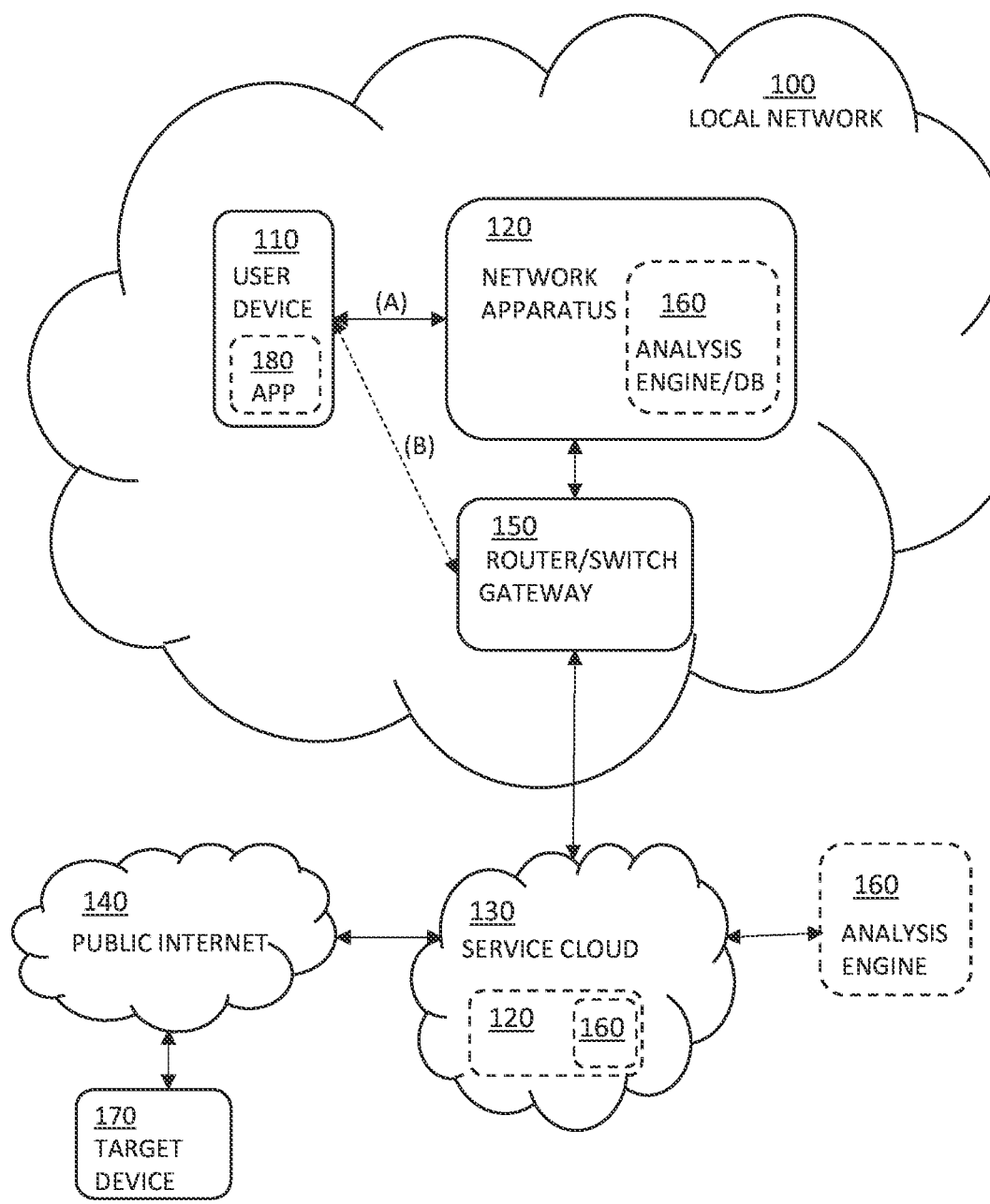
FIG. 1 illustrates an example system environment for a network apparatus in a computer network system.

FIG. 1 illustrates schematically an example of a system environment for a network apparatus 120. The system environment illustrated in FIG. 1 includes a local network 100 that may include one or more computing devices 110 with a client application 180, the network apparatus 120, a local gateway 150, and an analysis engine/database 160. The example system also includes a service cloud 130, such as a network operator's cloud or a security service provider's cloud and the Internet 140. The analysis engine 160, such as a web resource analysis engine, may reside in the local network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the client computing device 110 may communicate (A) via the network apparatus 120 residing in the local network 100. In another embodiment, the device 110 may communicate (B) directly via a network gateway or a modem 150, for example when the device is not in the local network 100. In an embodiment, the network operators may deploy a service platform on their broadband gateways 150 provided to customers and in their own cloud environments 130. The client device(s) 110 may also be configured to use the services provided by the service cloud 130 by one or more applications 180 installed on the device(s) 110.

The device 110 may be any computer device having Internet browsing capabilities, such a smartphone, laptop or a tablet. The network apparatus 120 may collect information, e.g., about the local network 100, including data about the network traffic through the local network 100 and data identifying devices in the local network 100, such as any smart appliances and user devices 110. The network apparatus 120 is configured to receive traffic control instructions from the analysis engine 160 and to process network traffic based on the traffic control instructions. Processing the network traffic through the local network 100, for example, can include restricting where network traffic can travel, blocking network traffic from entering the local network 100, redirecting a copy of network traffic packet or features of those packets to the analysis engine 160 for analysis (e.g., for malicious behaviour), or quarantining the network traffic to be reviewed by a user (e.g., via the user device 110) or network administrator. In some embodiments, the functionality of the network apparatus 120 is performed by a device that is a part of the local network 100, while in other embodiments, the functionality of the network apparatus 120 is performed by a device outside of the local network 100.

The network apparatus 120 may be configured to monitor traffic that travels through the local network 100. In some embodiments, the network apparatus 120 can be a device that is a part of the local network 100. The network apparatus 120 can be connected to the local network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the local network 100.

In some embodiments, the network apparatus 120 may intercept traffic in the local network 100 by signalling to the user device 110 that the network apparatus 120 is router 150. In some embodiments, the network apparatus 120 replaces the default gateway or gateway address of the local network 100 with its own internet address. In some embodiments, the local network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the local network 100.

The analysis engine 160 may receive and analyze network traffic data (e.g., forwarded by the network apparatus 120) associated with devices on the computer network. The analysis engine 160 may be implemented within a remote system (e.g., a cloud server) or within the local network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the local network router 150 may be configured to forward network traffic to the analysis engine 160. In some embodiments, the analysis engine 160 communicates with other devices on the computer network. In some embodiments, the analysis engine 160 is integrated into the network apparatus 120.

The local network 100 is a local area network (LAN) that comprises the one or more devices 110, network apparatus 120, and local network router 150. The local network 100 may be used for a number of purposes, including a home network or a network used by a business. The local network 100 is connected to the internet 140, allowing devices within the local network 100, including the user device 110, to communicate with devices outside of the local network 100. The local network 100 may be a private network that may require devices to present credentials to join the network, or it may be a public network allowing any device to join. In some embodiments, other devices, like personal computers, smartphones, or tablets, may join local network 100.

The internet 140 and the local network 100 may comprise any combination of LANs and wide area networks (WANs), using both wired and wireless communication systems. In some embodiments, the internet 140 and the local network 100 use standard communications technologies and protocols. Data exchanged over the internet 140 and the local network 100 may be represented using any suitable format, such as hypertext markup language (HTML) or extensible markup language (XML). In some embodiments, all or some of the communication links of the internet 140 and the local network 100 may be encrypted using any suitable technique or techniques.

The user/client device 110 is a computing device capable of receiving user input as well as transmitting and/or receiving data via the Internet 140 or local network 100. In some embodiments, a user device 110 is a conventional computer system, such as a desktop or a laptop computer. Alternatively, a user device 110 may be a device having computer functionality, such as a personal digital assistant (PDA), a mobile telephone, a smartphone, or another suitable device. The user device 110 is a network device configured to communicate with the Internet 140 or local network 100. In some embodiments, the user device 110 executes an application (e.g., application 180) allowing a user of the user device 110 to interact with other network devices, such as the smart appliances, the network apparatus 120, the gateway 150, or the analysis engine 160. For example, the user device 110 executes a browser application to enable interaction between the user device 110 and the network apparatus 120 via the local network 100.

The client application 180 is a computer program or software application configured to run on the user device 110. For example, the application 180 is a web browser, a mobile game, an email client, or a mapping program. The user device 110 can have any number of applications 180 installed. The application 180 may communicate, via the user device 110, with devices inside and outside of the local network 100.

QUIC (Quic user datagram protocol (UDP) Internet Connection) is an encrypted transport layer network protocol, and it is the new era of network communication that is considered fast, secure and reliable. QUIC has qualities of transport layer security (TLS) connections and TLS encryption, and it is implemented on UDP.

The QUIC protocol uses keys derived from a TLS handshake and relies on TLS for authentication and negotiation of parameters related to security and performance. The QUIC protocol contains an initialization phase where handshake messages are sent and received between a client and a server. First message of TLS handshake is when the client initiates a connection to the server using a client hello message. Server hello in turn describes a message used in the TLS handshake process that is sent by the server in response to the client hello message. The client hello and server hello messages are used to establish how the client and server should communicate.

Server name indication (SNI) is an extension of the TLS protocol that is used to indicate which hostname a client is attempting to connect at the start of the handshaking process. SNI allows a server to present multiple certificates on the same IP address and allows multiple secure websites to be served by the same IP address.

Embodiments of the invention enable managing and monitoring also encrypted network traffic, such as QUIC connections, based on server name indication (SNI). Thus, for example blocking or termination encrypted connections are enabled without risking security. For example, HTTPS monitoring may rely on information exchanged during TLS handshake, such as monitoring the SNI. SNI-based monitoring offers a good solution since it enhances both security and privacy protection as private data is encrypted while only the destination service is known.

Figure 2:
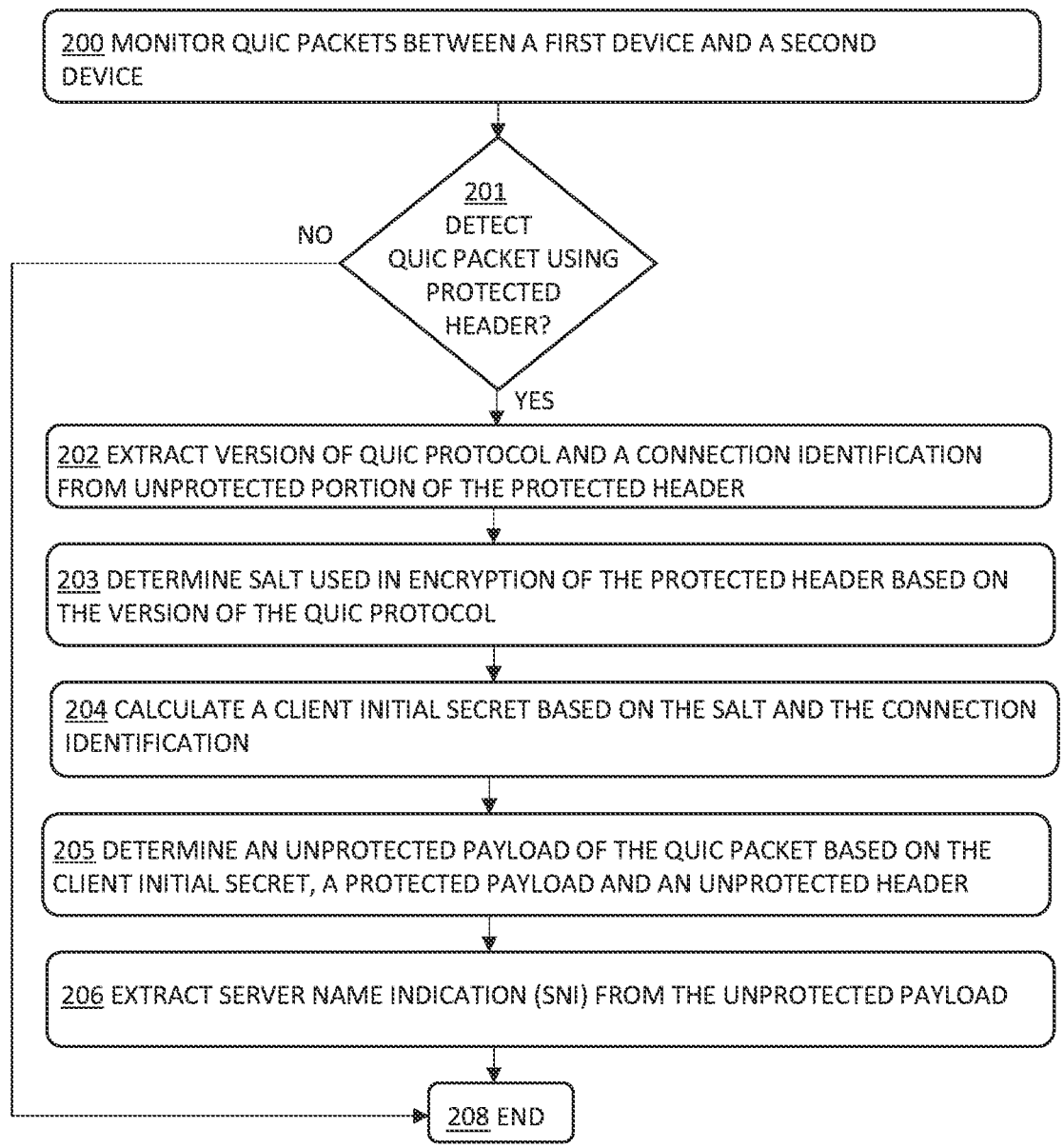
FIG. 2 illustrates a method, according to an embodiment.

FIG. 2 is a flow diagram illustrating an embodiment of a method at a network apparatus connecting one or more computing devices to a computer network. The network apparatus monitors connections relating to monitored network traffic passing through the network apparatus. The network apparatus may receive connection requests from client computing devices toward target computing devices and manage the connections according to predetermined rules or settings, for example.

In 200, a network gateway apparatus monitors QUIC packets between a first device and a second device.

In 202, in response to detecting (in 201) a QUIC packet having a protected header in use, a version of the QUIC protocol and a connection identification is extracted from an unprotected portion of the protected header. The first message of a TLS handshake comprises at least a connection identifier. The connection identifier extracted from the first message identifies a target computing device.

In 203, a salt used in encryption of the protected header is determined based on the version of the QUIC protocol. Salt is a random piece of data used in hashing data or passwords.

In 204, client initial secret is calculated based on the salt and the connection identification. The client initial secret is used for authentication. At registration, the client application is assigned unique client identification and client secret by an authentication server.

In 205, an unprotected payload of the QUIC packet is determined based on the client initial secret, a protected payload of the QUIC packet and the unprotected portion of the protected header.

In 206, a server name indication (SNI) is extracted from the unprotected payload.

In an embodiment, the client initial secret is calculated by using the salt and the connection identification as an input to a hash-based message authentication code (HMAC) Key Derivation function (HKDF) algorithm to calculate the client initial secret.

In an embodiment, a header protection key (HP), an initialization vector (IV) and a key are calculated based on the client initial secret and the HKDF algorithm.

In an embodiment, a mask is determined by feeding the first 16 bytes of the QUIC packet into an advanced encryption standard (AES) electronic codebook mode encryption (ECB) block. A packet number and packet number length in the protected header are calculated based on the mask.

In an embodiment, a nonce number is calculated based on the packet number and the initialization vector (IV).

In an embodiment, the unprotected header is calculated based on the packet number, the protected header and the packet number length.

In an embodiment, a starting offset of the protected payload is calculated based on the packet number length.

In an embodiment, an authentication tag is extracted from the last 16 bytes of the QUIC packet.

In an embodiment, the unprotected payload and a calculated authentication tag is determined by using the nonce, the protected payload, the key and the unprotected header as an input to authenticated encryption with associated data (AEAD) algorithm.

In an embodiment, the authentication tag extracted from the last 16 bytes of the QUIC packet is compared with the calculated authentication tag. In response to detecting a match between the extracted authentication tag and the calculated authentication tag, the decryption is determined as successful.

In an embodiment, based on the extracted SNI, further action is made to protect the computer network system. The further action may comprise reporting a security related incident, controlling or blocking connections or preventing communication between the first device and the second device, and applying other security measures to protect the computer network system and/or one or more computing devices of the computer network system.

In an embodiment, in response to receiving a response to a reputation request from the web resource analyzer engine, the QUIC connection is approved or denied based on the result included in the response from the web resource analyser engine.

Figure 3:
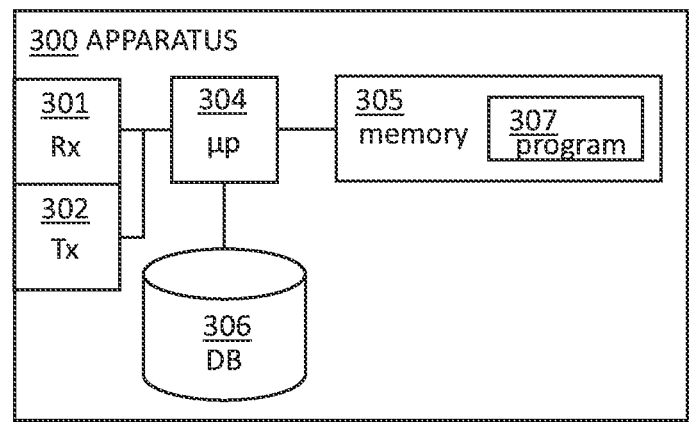
FIG. 3 is a block diagram of an apparatus, according to one embodiment.

Turning now to FIG. 3 that is showing an example of a network apparatus such as a gateway.

A processor is provided that is configured to detect connection requests relating to monitored network traffic passing through the network apparatus. Further, the processor 304 is configured to interrupt transmission of connection requests from a client computing device to a target computing device and to extract data identifying the target network computer based on the connection request. The processor is further configured to monitor QUIC packets between a first device and a second device. The processor is further configured to extract a version of the QUIC protocol and a connection ID from an unprotected portion of the protected header in response to detecting a QUIC packet having protected header in use. The processor 304 is further configured to determine a salt based on the version of the QUIC protocol and calculate client initial secret based on the salt and the connection ID. The processor is further configured to determine an unprotected payload of the QUIC packet based on the client initial secret, a protected payload of the QUIC packet and the unprotected header and to extract a SNI from the unprotected payload.

In an embodiment, the processor 304 is further configured to store data such as data related to the connection requests, state information, reputation data and domain data to the database 306. The database 306 is shown in this example as being located at the apparatus 300, but it will be appreciated that the apparatus 304 may alternatively access a remote database. The database 304 may comprise data collected from user devices or reputation data previously collected from the web resource analyzer engine.

The apparatus 300 is provided with a receiver 301 that receives the connection requests and responses. A transmitter 302 is also provided for communication with the user device and/or the outside server.

In the above description, the apparatus 300 is described as having different transmitter and receiver. It will be appreciated that these may be disposed in any suitable manner, for example in a single transmitter and receiver, a transceiver and so on. Similarly, a single processor 304 is described but it will be appreciated that the function of the processor may be performed by a single physical processor or by more than one processors.

The apparatus 300 is also provided with a non-transitory computer readable medium in the form of a memory 305. The memory may be used to store a computer program 307 which, when executed by the processor 300, causes the processor 304 to perform the functions described above. The computer program 307 may be provided from an external source. In an embodiment, at least some or even all of the functions of the method can be implemented in any apparatus, for example the user device or a server.

Figure 4:
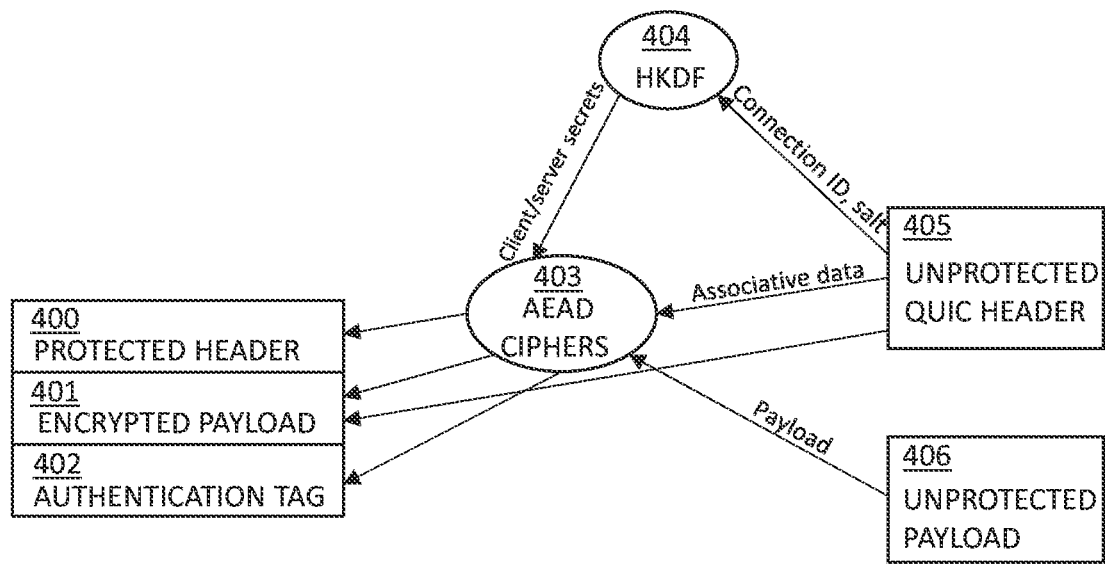
FIG. 4 illustrates a process, according to one embodiment.

FIG. 4 illustrates how a protected QUIC packet is created.

The QUIC protocol contains the SNI in the initialization client hello message. The QUIC initialization packet contains the TLS handshake protocol data inside the protected payload (401) of the QUIC packet which is created by encrypting the unprotected payload (406) with an AEAD cipher (403). The AEAD cipher (403) takes associative data from the unprotected header (405) and a set of client server secrets from the HKDF (404) output.

In an embodiment, SNIs may be extracted from QUIC streams between two hosts via a remote gateway. The solution may sit on a network gateway, for example. The solution may start with intercepting the client hello message as it is routed through the networking gateway. In an embodiment, all UDP packet are listened on port 443.

When a UDP packet is received, it is identified as a QUIC packet by checking if it has a long QUIC header type and then by checking for a magic byte as defined in the QUIC protocol. The packet is then checked to determine if it is using a version of QUIC that protects the header.

The version of the QUIC protocol is extracted from the unprotected portion (405) of the protected header (400) and then is used to determine which salt was used in encrypting the header. The connection ID is extracted from the unprotected portion of the header (405).

The salt and the connection ID are used as an input to the HKDF algorithm (404) to calculate the client initial secrets. The HP, IV and Key are calculated from the HKDF extract and expand algorithm using the client initial secrets.

The start of the payload is calculated by summing every length field for each field in the protected header (400) and assuming 4 bytes for the packet number. The length of the payload is calculated by subtracting the offset and fixed sized authentication tag (402) from the length of the packet.

The first 16 bytes of the payload are fed into the AES ECB with the HP for determining the mask. The mask (or a subnet mask) is a number that segments an existing IP address in a network, and it is used to determine whether a host is on the local subnet or on a remote network.

The mask is used to calculate the packet number and packet number length in the protected header (400). The packet number and IV are used to calculate the nonce as per the QUIC protocol.

The unprotected header is calculated by using the packet number, the protected header and the packet number length. The starting offset of the protected payload is calculated by using the packet number length.

The authentication tag is extracted from the last 16 bytes of the QUIC packet according to QUIC protocol. The nonce, the protected payload, the key, and the unprotected header are passed into the AEAD algorithm to determine the unprotected payload (406) and a calculated authentication tag.

In an embodiment, a check can be made on whether the decryption was successful by comparing the authentication tag with the calculated authentication tag and if they are a match, then the decryption is determined to be successful. If the authentication tag does not match with the calculated authentication tag, then the decryption is determined failed.

Finally, the SNI can be extracted from the unprotected payload (406).

It will be appreciated that various modifications may be made to the above-described embodiments without departing from the scope of the present invention.

For example, the database or web resource analysis engine may be in separate entities to the apparatus, in which case the apparatus will send queries remotely to the analysis engine.

The steps, signalling messages and related functions described above in relation to the figures are in no absolute chronological order, and some of the steps may be performed simultaneously or in a different order. Other functions may also be executed between the steps and other signalling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises one or more codes for performing the process steps according to the described example embodiments.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
    monitoring, by a network gateway apparatus comprising a processor device, Quic user datagram protocol (UDP) Internet Connection (QUIC) packets between a first device and a second device;
    in response to detecting a QUIC packet having a protected header in use, extracting a version of the QUIC protocol and a connection identification from an unprotected portion of the protected header;

determining a salt used in encryption of the protected header based on the version of the QUIC protocol;

calculating a client initial secret based on the salt and the connection identification;

determining an unprotected payload of the QUIC packet based on the client initial secret, a protected payload of the QUIC packet, and the unprotected portion of the protected header; and extracting a server name indication (SNI) from the unprotected payload.

2. The method according to claim 1, wherein calculating the client initial secret further comprises using the salt and the connection identification as an input to a hash-based message authentication code (HMAC) Key Derivation function (HKDF) algorithm to calculate the client initial secret.

3. The method according to claim 2, further comprising calculating a header protection key (HP), an initialization vector (IV), and a key based on the client initial secret and the HKDF algorithm.

4. The method according to claim 3 further comprising:
determining a mask by feeding a first 16 bytes of the QUIC packet into an advanced encryption standard (AES) electronic codebook mode encryption (ECB) block; and
calculating a packet number and packet number length in the protected header based on the mask.

5. The method according to claim 4, further comprising calculating a nonce number based on the packet number and the initialization vector (IV).

6. The method according to claim 4, further comprising calculating the unprotected header based on the packet number, the protected header, and the packet number length.

7. The method according to claim 4, further comprising calculating a starting offset of the protected payload based on the packet number length.

8. The method according to claim 1, further comprising extracting an authentication tag from a last 16 bytes of the QUIC packet.

9. The method according to claim 8, further comprising determining the unprotected payload and a calculated authentication tag by using nonce, the protected payload, a key, and the unprotected header as an input to authenticated encryption with associated data (AEAD) algorithm.

10. The method according to claim 9, further comprising:
comparing the authentication tag extracted from the last 16 bytes of the QUIC packet with the calculated authentication tag; and in response to detecting a match between the authentication tag extracted from the last 16 bytes of the QUIC packet and the calculated authentication tag, determining that decryption is successful.

11. A gateway apparatus comprising:
a memory; and
one or more processor devices coupled to the memory, the one or more processor devices configured to:
monitor Quic user datagram protocol (UDP) Internet Connection (QUIC) packets between a first device and a second device;
in response to detecting a QUIC packet having a protected header in use, extract a version of the QUIC protocol and a connection identification from an unprotected portion of the protected header;
determine a salt used in encryption of the protected header based on the version of the QUIC protocol;
calculate a client initial secret based on the salt and the connection identification;
determine an unprotected payload of the QUIC packet based on the client initial secret, a protected payload of the QUIC packet, and the unprotected portion of the protected header; and
extract a server name indication (SNI) from the unprotected payload.

12. The apparatus according to claim 11, the one or more processor devices being further configured to calculate the client initial secret by using the salt and the connection identification as an input to a hash-based message authentication code (HMAC) Key Derivation function (HKDF) algorithm to calculate the client initial secret.

13. The apparatus according to claim 12, the one or more processor devices being further configured to calculate a header protection key (HP), an initialization vector (IV), and a key based on the client initial secret and the HKDF algorithm.

14. The apparatus according to claim 11, the one or more processor devices being further configured to:
determine a mask by feeding a first 16 bytes of the QUIC packet into an advanced encryption standard (AES) electronic codebook mode encryption (ECB) block; and
calculate a packet number and packet number length in the protected header based on the mask.

15. The apparatus according to claim 14, the one or more processor devices being further configured to:
calculate a nonce number based on the packet number and an initialization vector (IV);
calculate the unprotected header based on the packet number, the protected header, and the packet number length; and
calculate a starting offset of the protected payload based on the packet number length.

16. The apparatus according to claim 11, the one or more processor devices being further configured to extract an authentication tag from a last 16 bytes of the QUIC packet.

17. The apparatus according to claim 16, the one or more processor devices being further configured to determine the unprotected payload and a calculated authentication tag by using nonce, the protected payload, a key, and the unprotected header as an input to an authenticated encryption with associated data (AEAD) algorithm.

18. The apparatus according to claim 17, the one or more processor devices being further configured to:
compare the authentication tag extracted from the last 16 bytes of the QUIC packet with the calculated authentication tag; and
in response to detecting a match between the authentication tag extracted from the last 16 bytes of the QUIC packet and the calculated authentication tag, determining that decryption is successful.

19. The apparatus according to claim 11, the one or more processor devices being further configured to one or more of: report a security related incident, control or block connections, prevent communication between the first device and the second device, and apply other security measures to protect the computer network system and/or one or more computing devices of the computer network system.

20. A non-transitory computer-readable medium comprising stored program code, the program code comprised of computer-executable instructions that, when executed by a processor device, causes the processor device to:
monitor Quic user datagram protocol (UDP) Internet Connection (QUIC) packets between a first device and a second device;

in response to detecting a QUIC packet having a protected header in use, extract a version of the QUIC protocol and a connection identification from an unprotected portion of the protected header;
determine a salt used in encryption of the protected header based on the version of the QUIC protocol;
calculate a client initial secret based on the salt and the connection identification;
determine an unprotected payload of the QUIC packet based on the client initial secret, a protected payload of the QUIC packet, and the unprotected portion of the protected header; and
extract a server name indication (SNI) from the unprotected payload.

* * * * *